United States Patent Office 3,783,019
Patented Jan. 1, 1974

3,783,019
METHOD FOR PRODUCING ELECTROPHOTO-GRAPHIC RECORDING ELEMENTS
Yoshitaka Hashiguchi, Amagasaki-shi, and Shozo Watayama, Fuji-shi, Japan, assignors to Kabushiki Kaisha Kohjin, Tokyo, and Teikoku Kagaku Sangyo Kabushiki Kaisha, Osaka, Japan
No Drawing. Filed June 9, 1971, Ser. No. 151,595
Claims priority, application Japan, June 11, 1970, 45/49,821
Int. Cl. G01d 15/06; G03c 1/74
U.S. Cl. 117—201                      6 Claims

ABSTRACT OF THE DISCLOSURE

Electrophotographic recording elements which have an excellent light sensitivity and do not receive any influence from the variation in the moisture of the ambient atmosphere, are prepared by dissolving a vinyl compound copolymer (e.g. vinyl acetate-crotonic acid copolymer) which is soluble in an organic solvent (e.g. methanol) and also soluble in water in the presence of a volatile base (e.g. ammonia), in an organic solvent, an organic solvent containing a volatile base or a mixture of less than 5 parts by weight of water, 1 part by weight of an organic solvent and a volatile base; mixing the resultant solution with a diluent mainly of water; and coating a support, e.g. sized paper, with the resultant aqueous dispersion (coating color) containing zinc oxide, the volatile base, the organic solvent and the vinyl compound copolymer.

---

This invention relates to a method for producing electrophotographic recording elements, and more particularly it relates to electrophotographic recording elements having an excellent light sensitivity, which are prepared by using aqueous resinous binder and do not receive any influence from the variation in the moisture of the ambient atmosphere.

In general, electrophotographic recording elements are prepared by coating a support with a coating color containing inorganic or organic photoconductor dispersed in a resinous binder having a high grade of insulating property.

According to a method most widely used, electrophotographic recording elements are prepared by dispersing zinc oxide as a photoconductor in a resinous binder dissolved in an organic solvent to produce a coating color and coating paper or film as a support with the said coating color, followed by evaporation of solvent. Since the resinous binder is insensitive to moisture the elements thus prepared are not receptive to the influence of atmospheric moisture.

On one hand, methods in which an organic solvent is used have many disadvantages, but on the other hand, methods in which aqueous binder is used, are superior to the methods in which an organic solvent is used, from following points;

(1) freedom from fire hazard
(2) freedom from toxicity
(3) considerably lower cost.

As an example for such a method, there is a method disclosed in U.S. Pat. 3,160,503.

A preparation of electrophotographic recording elements which relies on dispersing zinc oxide in an aqueous solution of vinyl acetate-crotonic acid copolymer coexisting with a volatile base, and coating a suitable support with the resultant dispersion, followed by drying, is proposed in that patent. However, even the elements prepared according to this method absorb moisture from the atmosphere under a highly humid condition and the image quality thereof is not preferable.

It has been also known to use an emulsion type binder instead of an aqueous resinous binder but since the influence of emulsifiers upon electrical properties is notable, the elements in which such an emulsion type binder is used are not practical.

A first object of the present invention is to provide a method for producing electrophotographic recording elements having the equivalent qualities to those of the elements prepared by using a common organic solvent but no danger of fire and toxicity and with an inexpensive cost.

A second object of the present invention is to provide a method for applying an electrophotographic recording layer (or electrophotographic coating color) directly to a common sized paper as a support without forming any barrier coating with a film having a resistance to an organic solvent.

A third object of the present invention is to provide a method for preparing an aqueous coating color for electrophotographic recording layer by using a resinous binder having inferior solubility in water even in the presence of a volatile base.

Other objects of the present invention will be apparent from the description which follows hereinafter.

These objects can be attained by the method of the present invention which comprises dissolving a vinyl compound copolymer which is soluble in an organic solvent and also soluble in water in the presence of a volatile base, in an organic solvent, an organic solvent containing a volatile base or a mixture of less than 5 parts by weight of water, 1 part by weight of an organic solvent and a volatile base, mixing the resultant solution with a photoconductive zinc oxide, diluting the resultant mixture with a diluent mainly of water and coating a support with the resultant aqueous dispersion containing zinc oxide, the volatile base, the organic solvent and the vinyl compound copolymer and dispersed with a diluent mainly of water.

In the composition for electrophotographic recording elements of the present invention, there can be employed as a binder, a vinyl copolymer soluble in an organic solvent and also soluble in water in the presence of a volatile base which is obtained by copolymerization of at least one vinyl monomer such as vinyl acetate, acrylic ester, methacrylic ester or styrene and a polymerizable monomer containing at least one carboxyl group such as crontonic acid, acrylic acid, methacrylic acid, itaconic acid, maleic acid, maleic anhydride or mono-alkyl itaconate. It is the feature of the present invention that zinc oxide is added to a vinyl copolymer dissolved in a solvent mainly composed of an organic solvent and containing less than specified amount of water, if necessary a sensitizing dye is further added, and after sufficient mixing, the mixture is diluted directly with a diluent mainly of water thereby to minimize the influence of water upon the electrophotographic property of zinc oxide and at the same time to exhibit the effect of sensitizing dye most effectively. More particularly, a vinyl copolymer which is soluble in an organic solvent and also soluble in water in the presence of a volatile base, is at first dissolved in an organic solvent, an organic solvent containing a volatile base or mixed solvent of an organic solvent and water containing a volatile base, resultant solution is mixed with zinc oxide in advance, if necessary a sensitizing dye is added and after addition of a volatile base (this is not always necessary when a volatile base is already included), water is added to dilute the solution into a dispersion of zinc oxide, alternatively, water containing a volatile base or an aqueous solution of resin dissolved by using a volatile base is added to disperse zinc oxide. Resultant coating color is applied to commercially available common sized paper, as a support, and resultant coated paper is dried to give an electrophotographic recording element. The elements thus prepared are insensitive to moisture, have a large charge acceptance and an excellent light sensitivity. Further since their dispersion property of zinc oxide is good, an electrophotographic recording layer can be finished up very minutely. As a result, the images become clear-cut, the developing power is excellent and the adhesive property between the layer and the support is nice. Further this coating color for electrophotographic recording layer has brought about many advantageous effects such as no bubbling which has been a cause of trouble in case of conventional aqueous resinous binder, and a quick drying speed.

When a solvent used in the solution of resinous binder which has been mixed with zinc oxide in advance, is a mixed solvent of water and an organic solvent, the amount of a volatile base and the proportion of water to the organic solvent are important. It is preferable that the proportion of water be in the range less than 5 parts by weight, preferably less than 3 parts by weight, relative to one part by weight of the organic solvent. In this case, greater the amount of water relative to the organic solvent, greater amount of the volatile base is necessary in porportion to the amount of water.

Desired effect in the production process as well as in the quality can be attained by treating in advance zinc oxide with a resinous solution as above-mentioned, even if water is thereafter added. It is believed that the reason for the above-mentioned has intimate connection with the dissolved state of resinuous solution and dispersed state of zinc oxide in the said solution. Namely, water containing a volatile base is a poorer solvent than an organic solvent to the above-mentioned vinyl copolymer. Accordingly, the affinity between the segments of the polymer is greater than the affinity between the segments and water, and hence in a solvent which is only water containing a volatile base, the molecular chains of the polymer is probably in the "balling" state, and the dispersion state of zinc oxide is considered to be non-uniform.

On the other hand, in case of the present invention, the affinity between the segments of the polymer and a solvent becomes greater than the affinity between the segments by mixing of an organic solvent which is a good solvent for the polymer, and hence the molecular chains of polymer are considered to be in the state of random extension. Accordingly, the dispersion state of zinc oxide is considered to be in the state of higher uniformity in case of the present invention. In such a state, the adsorption of sensitizing dye to zinc oxide becomes more effective.

The present invention seems to be based upon the above-mentioned principle but it is not limited of course by any principle.

Further since a solvent mainly composed of water is used in the present invention, there is an advantage that direct coating upon a common sized paper having no barrier coating can be carried out.

In general, in the electrophotographic recording elements in which a water soluble resin is used as a binder for a photoconductor zinc oxide, there is a tendency that greater the ratio of zinc oxide to binder, worse the adhesive property with respect to support. Whereas, in the coating color for electrophotographic recording layer of the present invention, since the adhesive property with respect to support is superior, it is also possible to increase the ratio of zinc oxide to binder up to from 5/1 to 10/1.

Organic solvents which are to be used in the present invention are selected from among those which can dissolve a copolymer of at least one vinyl monomer such as vinyl acetate, acrylic esters, methacrylic esters or styrene and at least one polymerizable monomer having at least one carboxyl group, such as crotonic acid, acrylic acid, methacrylic acid, itaconic acid, maleic acid, maleic anhydride or mono-alkyl itaconate, and have a relatively large solubility to water. For example, they are selected from such hydrophilic solvents as alcohols (e.g. methanol, ethanol, isopropanol, tertiary butanol etc.), ketones (e.g. acetone, methyl ethyl ketone, etc.) and esters (e.g. methyl acetate, ethyl acetate, etc.) and mixed solvents of the above-mentioned and a hydrophobic solvent capable of mixing with the above-mentioned at any ratio such as toluene, xylene, benzene, trichloroethylene or the like.

Volatile bases are volatile organic amines represented by ammonia, methylamine, dimethylamine, trimethylamine, ethylamine, diethylamine, triethylamine, propylamine, dipropylamine, tripropylamine, isobutylamine, n-butylamine, morpholine, etc.

From the electrophotographic recording element, clear-cut images can be obtained even by a common electrophotographic process (i.e. corona charging, exposure, and development) carried out immediately after drying. With regard to image quality, superior images are formed which are completely freed of drawbacks of conventional electrophotographic recording elements employing aqueous resinous binder, such as white spots in the black background, discontinuity of line image, etc., which have been an unsolved problem for the above-mentioned conventional elements.

Another characteristic feature of the electrophotographic recording element of the present invention is that it has such superior properties as very high moisture resistance, high light sensitivity and excellent dispersing property of zinc oxide, high image quality derived from these properties and superior adhesive property of electrophotographic recording layer. The superiority of the above-mentioned moisture resistance can be seen from the fact that the elements are furnished with the electrical properties sufficient as an electrophotography even under such a severe condition as 80–90% of relative humidity and the density of image does not show appreciable reduction.

The above-mentioned effects can be attained in cases of vinyl copolymers of the present invention in general. To be surprising enough, it is possible to obtain electrophotographic recording elements which are sufficient for practical purpose even without using an organic solvent in case of a vinyl copolymer consisting of methyl acrylate, methyl methacrylate and a polymerizable monomer having at least one carboxyl group and if mol percent of —COOH of the monomer based upon the copolymer is in the range of 1–10% and mol ratio of methyl acrylate to methyl methacrylate is in the range of 4/1–1/1. It goes without saying that the use of an organic solvent, as above-mentioned, shows also excellent results.

The present invention is further illustrated by the following non-limitative examples.

EXAMPLE 1

50 g. of a copolymer of 93 mol percent vinyl acetate and 7 mol percent crotonic acid was dissolved in a mixture of 75 g. of methanol and 8 ml. of 28% aqueous solution of ammonia. 500 g. of zinc oxide was added to and mixed well with this solution in advance.

If ammonia is present, the mixing can be carried out very easily. Thereafter 275 g. of water was added to the resultant mixture and dispersion was carried out in a ball mill for 2 hours to prepare a coating color. Resultant color has very good dispersing property, is stable also as a dispersion, and shows less bubbling and extremely good coating applicability. Electrophotographic recording elements were prepared by coating a common sized paper having no barrier coating with this coating color in a thickness of 30 g./m.$^2$ by dry weight and then drying the coated layer at 100° C. for 3 minutes.

Even immediately after drying, clear-cut image could be obtained from this electrophotographic element. In order to measure adhesive property of this electrophotographic recording element between electrophotographic recording layer and paper support, Dennison wax pick test was carried out. As a result, pick strength capable of resisting up to No. 7 wax i.e. extremely superior adhesive property was indicated.

When electrostatic properties of this electrophotographic recording element were measured with a rotary sector type electrometer, charge acceptance was observed to be 560 volts after the treatment under 60% R.H. for 24 hours and 390 volts after the treatment under 90% R.H. for 24 hours.

As a comparative example (control), the method of Example 1 of U.S. Pat. 3,160,503 was carried out but without using methanol. 20 g. of vinyl acetate-crotonic acid copolymer (containing 5% by weight of crotonic acid) was dissolved in a solution of 100 g. of water and 2 g. of 28% aqueous ammonia solution, and 120 g. of zinc oxide was added with stirring. After dispersing in a ball mill, resultant coating color was coated on a common sized paper to prepare an electrophotographic recording element and its electrostatic properties were likewise measured, whereby charge acceptance after treatment under 60% R.H. for 24 hours was found to be 420 volts and after treatment under 90% R.H. for 24 hours, 60 volts. By using the same toluene solution of vinyl acetate-crotonic acid copolymer, an electrophotographic recording element was prepared as in the comparative example except that the paper to which barrier coating had been applied, and its electrostatic properties were measured whereby charge acceptances were found 500 volts and 360 volts, respectively, after treatment under 60% R.H. for 24 hours and after treatment under 90% R.H. for 24 hours.

Upon the above-mentioned three kinds of electrophotographic recording elements which have been treated under 90% R.H. for 24 hours, images were formed through a common electrophotographic process and compared. The image of the electrophotographic recording element of the present specific example was identical in image density to the image in the case of toluene solution of the comparative example. Whereas the image in the case of aqueous solution of the comparative example was not formed. Further, exposure was carried out sufficiently.

EXAMPLE 2

To a binder solution of 50 g. of a 93 mol percent vinyl acetate-7 mol percent crotonic acid copolymer dissolved in 75 g. methanol and 8 ml. of 28% aqueous ammonia solution, was added 3 ml. of 1% methanol solution of Rose bengal as a sensitizing dye. To the resultant solution was added 500 g. of zinc oxide and well mixed. Then, the same treatment as in Example 1 followed to prepare an electrophotographic recording element. The coating color in this case was very good in dispersibility of zinc oxide; few in bubbling even at its high solid content; superior in coating applicability to support; and further good in setting of coating color due to its rapid initial drying, similarly to that of Example 1. The light sensitivity of the electrophotographic element thus obtained was as large as 8 times that of Example 1.

EXAMPLE 3

50 g. of the copolymer of Example 1 was dissolved in 50 g. of methanol and 8 ml. of 28% aqueous ammonia solution, and 150 g. of water was then added to the resultant solution to prepare a uniform resin solution, followed successively by adding 400 g. of zinc oxide, mixing, diluting with 200 g. of water and dispersing by means of a ball mill.

The coating color thus obtained was few in bubbling; superior in dispersibility; and very good in coating applicability. Using this coating color, an electrophotographic element was prepared in the same manner as in Example 1. A clear image was obtained from the resultant element, even just after its drying. Further, its electrostatic properties were measured. The charge acceptance was 540 volts after a treatment under 60% R.H. for 24 hours, while 310 volts even after a treatment under 90% R.H. for 24 hours. Further, using the electrophotographic recording element as treated under 90% R.H. for 24 hours, an image was formed by a usual electrophotographic process to give a very clear image. As apparent from the above-mentioned example, the coating color of this example wherein a resinous binder was dissolved by the use of a solvent mainly composed of an organic solvent containing water in an amount below a defined one and zinc oxide was in advance treated with the resultant solution, was much superior in moisture-resisting property, dispersibility of zinc oxide and coating applicability in spite of the amount of water used to zinc oxide having no large difference, as compared with that of control of Example 1 wherein no organic solvent was used. This is a fact which is generally unexpected in case where an organic solvent merely mixed with water is used, and shows clearly the specific feature of the present invention.

EXAMPLE 4

50 g. of the copolymer described in Example 1 was dissolved in a solvent mixture consisting of 50 g. of methanol, 25 g. of toluene and 8 g. of triethylamine. To the resultant solution was added 3 ml. of 1% methanol solution of Rose bengal as a sensitizing dye, and then added 500 g. of zinc oxide. After well mixing, the resultant mixture was diluted by addinfi 400 g. of water. Using a dispersion thus obtained, an electrophotographic recording element was prepared in the same manner as in Example 1. The resultant product showed an excellent moisture-resisting property similar to those of the electrophotographic recording elements prepared in Examples 1–3.

EXAMPLE 5

50 g. of the copolymer described in Example 1 was dissolved in a solvent mixture consisting of 50 g. of methanol, 25 g. of toluene and 10 g. of 28% aqueous ammonia solution and then diluted by adding 150 g. of water. To the resultant solution was added 3 ml. of 1% methanol solution of Rose bengal as a sensitizing dye, followed successively by adding 500 g. of zinc oxide, dispersing, adding 300 g. of additional water and dispersing for 2 hours by means of a ball mill to prepare an electrophotographic coating color. Using a dispersion thus obtained, an electrophotographic recording element was prepared in the same manner as in Example 1.

The resultant element showed an excellent moisture-resisting property similarly to those prepared in Examples 1–4, and even after a treatment for 24 hours under 90% R.H., a clear image was obtained. The light decay rate of the surface potential of the element was measured under 60% R.H., in term of an exposure $E_{10}$ (lux-second) required for a decay from the initial surface potential to 1/10 thereof. The $E_{10}$ was 40 lux-second.

On the other hand, an electrophotographic recording element was prepared as a control, without using any organic solvent, by using the same sensitizing dye in the same amount as in the instant example, and in accordance with the method of Example 1 described in the above-mentioned U.S. Pat. 3,160,503. The light decay rate of the resultant element was measured, and its $E_{10}$ was 90 lux-seconds. Thus, it was confirmed that the recording element of the present invention brought about a notable improvement in light sensitivity.

EXAMPLE 6

25 g. of vinyl acetate-crotonic acid copolymer consisting of 97 mol percent of vinyl acetate and 3 mol percent of crotonic acid was dissolved in 75 g. of methanol. To the resultant solution were added 500 g. of zinc oxide and 3 g. of triethylamine and well mixed. The resultant zinc oxide dispersion was introduced into a resin in which 25 g. of vinyl acetate-crotonic acid copolymer was dissolved in 425 g. of water by using 4 g. of triethylamine, and dispersed for 2 hours by means of a ball mill. Using a dispersion thus obtained, an electrophotographic recording element was prepared in the same manner as in Example 1. The resultant element was excellent in moisture-resisting property similar to that of Example 1, and even after a treatment under 90% R.H. for 24 hours, almost no reduction in image quality was observed.

EXAMPLE 7

To 125 g. of 40% methanol solution of ethyl acrylate-methyl methacrylate-acrylic acid terpolymer were added 50 g. of methanol, 8 g. of triethylamine and 3 ml. of 1% methanol solution of Rose bengal, then added 500 g. of zinc oxide, and well mixed together. The resultant mixture was diluted by 350 g. of water, and dispersed for 2 hours by means of a ball mill. The resultant dispersion had a good dispersibility, a superior stability, almost no bubbling and an excellent coating applicability. Using this coating color, an electrophotographic recording element was prepared in the same manner as in Example 1. The resultant element was excellent in moisture-resisting property similar to those of Examples 1-6, and even after a treatment under 90% R.H. for 24 hours, a clear image was obtained.

EXAMPLE 8

50 g. of methyl acrylatemethyl methacrylate-monomethly itaconate terpolymer was dissolved by adding thereto 50 g. of methanol and 8 ml. of 28% aqueous ammonia solution. To the resultant solution was added 150 g. of water to prepare a uniform resin solution. To the solution was added 400 g. of zinc oxide and well mixed. The resultant mixture was diluted by 200 g. of water and dispersed by means of a ball mill. Using the resultant dispersion, an electrophotographic recording element was prepared in the same manner as in Example 1. The element thus obtained was very excellent in image quality similar to that of Example 3, and also good in moisture-resisting property.

EXAMPLE 9

50 g. of a copolymer of styrene and maleic anhydride was dissolved in a solvent mixture consisting of 60 g. of acetone, 10 g. of toluene and 5 g. of di-isopropylamine. To the resultant solution was added 400 g. of zinc oxide and well mixed. The resultant mixture was diluted by 200 g. of water and dispersed. Using the resultant dispersion, an electrophotographic recording element was prepared in the same manner as in Example 1. The resultant element showed a strong resistance to moisture, and a good image was obtained even under high humidity condition.

Another characteristic feature of the present invention consists in the fact that even a binder resin which is not easily soluble in water alone, as a solvent, even in the presence of a volatile base, can be easily dissolved by the aid of an organic solvent, in the present invention, and hence useful as a binder of zinc oxide.

Further, another characteristic feature consists in the fact that even when a volatile base which cannot dissolve a binder resin in water by itself alone on account of its low basicity, it can be used effectively if a solvent mixture containing it is used, as in the present invention. It is apparent that these facts are very advantageous features from the viewpoint of the moisture-resisting property of the electrophotographic recording layer.

EXAMPLE 10

Each 100 g. of methyl acrylate (which is hereinafter abbreviated to MA)—methyl methacrylate (which is hereinafter abbreviated to MMA)—monomethyl itaconate (which is hereinafter abbreviated to MMI) terpolymer whose component ratio was verified as in Table 1, was dissolved by adding thereto 80 cc. of triethyl amine and 270 cc. of water, followed successively by adding 600 g. of zinc oxide, adding a sensitizing dye as shown in Example 2, dispersing in advance, adding 200 cc. of water, and dispersing for 2 hours by means of a ball mill to prepare an electrophotographic coating color. The resultant coating color was coated on a usual sized paper by 30 g./m.² based on the dry weight, followed by drying at 100° C. for 3 minutes to prepare an electrophotographic recording element. The image quality and electrostatic property of each element thus obtained were measured after standing for 24 hours under an environmental condition of 60% R.H. or 90% R.H. The results are shown in Table 1.

The terpolymers of Tables 1, 2, and 3 (which hereinafter appear) were polymerized according to well-known polymerization procedure with almost quantitative yield.

TABLE 1

| Item | Example number | | | | |
|---|---|---|---|---|---|
| | I | II | III | IV | V |
| Composition of terpolymer mol percent: | | | | | |
| MA | 83 | 77 | 65 | 48.5 | 32. |
| MMA | 14 | 20 | 32 | 48.5 | 65. |
| MMI | 3 | 3 | 3 | 3 | 3. |
| Dispersing property of coating color | Good | Good | Good | Good | Poor. |
| Image quality: | | | | | |
| 60% RH | Poor | do | do | do | Do.[b] |
| 90% RH | Very poor[a] | do | do | do | Do.[b] |
| Electrostatic property: | | | | | |
| 60% RH: | | | | | |
| $V_0$ [c] | 300 | 560 | 580 | 580 | 600. |
| $V_{60}/V_0$ [d] | 0.20 | 0.75 | 0.80 | 0.75 | 0.70. |
| $E_{10}$ [e] | 50 | 40 | 35 | 40 | 100. |
| 90% RH: | | | | | |
| $V_0$ [c] | 20 | 400 | 440 | 430 | 450. |
| $V_{60}/V_0$ [d] | 0.10 | 0.65 | 0.68 | 0.67 | 0.68. |
| $E_{10}$ [e] | 40 | 35 | 30 | 35 | 90. |

[a] No image was obtained.
[b] Fog.
[c] Charge acceptance (volt).
[d] Charge retention ratio after 60 seconds in the dark.
[e] Exposure (lux-second) required for a decay from a charge acceptance $V_0$ to a charge acceptance of 1/10 of $V_0$.

As shown in Table 1, satisfactory results were obtained in the range of molar ratio of MA/MMA of 4/1–1/1, but only unsatisfactory results were obtained at 6/1 and 1/2.

EXAMPLE 11

Each 100 g. of MA-MMA-MMI terpolymers having a molar ratio of MA/MA of 2/1 and having various amount of MMI as in Table 2, was dissolved by adding thereto 50 cc. of 28% aqueous ammonia solution and 300 cc. of water, followed by adding 700 g. of zinc oxide and then carrying out the same procedure as in Example 10 to prepare an electrophotographic recording element. The resultant elements were measured as in Example 10. The results are shown in Table 2.

As apparent from Table 2, dispersing property, image quality and electrostatic property were all good in the case of the amount of MMI of 1.0–10 mol percent. Whereas, in the case of the amount of MMI of 0.2 mol percent, said copolymer was hardly dissolved in water, and hence dispersing property was inferior and also charge acceptance was low. Accordingly, no satisfactory result was obtained in image quality. In the case of too much amount of MMI, dispersing property was good, but light decay as shown by $E_{10}$ was slow; image quality was bad and fog occurred.

TABLE 2

| Item | Example number | | | | |
|---|---|---|---|---|---|
| | VI | VII | VIII | IX | X |
| Composition of terpolymer, mol percent: | | | | | |
| MA | 66.5 | 66 | 64 | 60 | 56. |
| MMA | 33.3 | 31 | 32 | 30 | 28. |
| MMI | 0.2 | 1 | 4 | 10 | 16. |
| Dispersing property of coating color. | Poor | Good | Good | Good | Good. |
| Image quality: | | | | | |
| 60% RH | do | do | do | do | Poor.b |
| 90% RH | do.a | do | do | do | Do.b |
| Electrostatic property: | | | | | |
| 60% RH: | | | | | |
| $V_0{}^c$ | 200 | 480 | 580 | 570 | 560. |
| $V_{60}/V_0{}^d$ | 0.20 | 0.70 | 0.80 | 0.75 | 0.60. |
| $E_{10}{}^e$ | 50 | 45 | 35 | 40 | 100. |
| 90% RH: | | | | | |
| $V_0{}^c$ | 30 | 380 | 440 | 430 | 450. |
| $V_{60}/V_0{}^d$ | 0.10 | 0.64 | 0.68 | 0.66 | 0.65. |
| $E_{10}{}^e$ | 50 | 35 | 30 | 35 | 90. | a–e Marks are the same as in Table 1.

EXAMPLE 12

Each 100 g. of MA-MMA-(a polymerizable monomer having one or more carboxyl groups) terpolymers having a molar ratio of MA/MMA of 2/1 and also having various kinds of the polymerizable monomer having one or more carboxyl groups as in Table 3, was dissolved by adding 80 cc. of triethylamine and 470 cc. of water, followed by adding 700 g. of zinc oxide and then carrying out the same procedure as in Example 10 to prepare an electrophotographic recording element. The resultant elements were measured as in Example 10. The results are shown in Table 3.

As aparent from Table 3, even if the kinds of the polymerizable monomers having one or more carboxyl groups were varied, dispersing property, image quality and electrostatic property were all good and suitable for practical use, if the molar ratio of MA/MMA as well as the molar ratio of the carboxyl group were each within a pertinent range.

TABLE 3

| Item | Example number | | | | | |
|---|---|---|---|---|---|---|
| | XI | XII | XIII | XIV | XV | XVI |
| Composition of terpolymer, mol percent: | | | | | | |
| MA | 64 | 64 | 64 | 64 | 64 | 64. |
| MMA | 32 | 32 | 32 | 32 | 32 | 32. |
| R—COOH f | R=MMI, 4 | R=itaconic, 4 | R=acrylic, 4 | R=methacrylic, 4 | R=maleic anhydride, 4 | R=acrylic 1.5 and itaconic 2.5. |
| Dispersing property of coating color | Good | Good | Good | Good | Good | Good. |
| Image quality: | | | | | | |
| 60% RH | do | do | do | do | do | Do. |
| 90% RH | do | do | do | do | do | Do. |
| Electrostatic property: | | | | | | |
| 60% RH: | | | | | | |
| $V_0{}^c$ | 590 | 580 | 530 | 535 | 520 | 540. |
| $V_{60}/V_0{}^d$ | 0.80 | 0.79 | 0.70 | 0.75 | 0.73 | 0.75. |
| $E_{10}{}^e$ | 40 | 40 | 45 | 47 | 48 | 45. |
| 90% RH: | | | | | | |
| $V_0{}^c$ | 430 | 440 | 350 | 365 | 340 | 440. |
| $V_{60}/V_0{}^d$ | 0.67 | 0.68 | 0.60 | 0.61 | 0.62 | 0.70. |
| $E_{10}{}^e$ | 35 | 35 | 40 | 42 | 48 | 40. | c–e Marks are the same as in Table 1.
f Molar percent of RCOOH was calculated only from the viewpoint of COOH.

As apparent from the results of Examples 10–12, it was found that if vinyl terpolymers consisting of MA, MMA and a polymerizable monomer having one or more carboxyl groups contain a polymerizable monomer unit whose —COOH mol percent is within a range of 1–10% based upon the copolymer and have a molar ratio of MA/MMA within a range of 4/1–1/1, electrophotographic recording elements suitable for practical use can be produced without using any organic solvent.

What is claimed is:

1. The method for producing electrophotographic recording elements which comprises:
    (a) forming a solution of vinyl compound copolymer in a mixture of (A) an organic solvent selected from the group consisting of (a) hydrophilic organic solvents including methanol, ethanol, isopropanol, tertiary butanol, acetone, methyl ethyl ketone, methyl acetate and ethyl acetate and (b) a mixture of the aforesaid hydrophilic organic solvent with a hydrophobic organic solvent selected from the group consisting of toluene, xylene, benzene and trichloroethylene and (B) a volatile base selected from the group consisting of ammonia, methylamine, dimethylamine, trimethylamine, ethylamine, diethylamine triethylamine, propylamne, dipropylamine, tripropylamine, isobutylamine, n-butylamine and morpholine,
    (b) mixing the solution formed in (a) with a photoconductive zinc oxide,
    (c) diluting the mixture of (b) with water, and
    (d) coating a support surface with the aqueous dispersion of (c),
    (e) said vinyl compound copolymer being soluble in the materials set forth in (a) and being the copolymer of at least one vinyl monomer selected from the group consisting of vinyl acetate, acrylic ester, methacrylic ester and styrene with a polymerizable monomer containing at least one carboxyl group selected from the group consisting of crotonic acid, acrylic acid, methacrylic acid, itaconic acid, maleic acid, maleic anhydride and mono-alkyl itaconate.

2. The method for producing electrophotographic recording elements which comprises:
    (a) forming a solution of a portion of a vinyl compound copolymer in a hydrophilic organic solvent selected from the group consisting of methanol, ethanol, isopropanol, tertiary butanol, acetone, methyl ethyl ketone, methyl acetate and ethyl acetate, or in a solvent mixture of said hydrophylic organic solvent with a hydrophobic organic solvent selected from the group consisting of toluene, xylene, benzene and trichloethylene,
    (b) mixing the solution formed in (a) with a photoconductive zinc oxide and a volatile base selected from the group consisting of ammonia, methylamine, dimethylamine, trimethylamine, ethylamine, diethylamine, triethylamine, propylamine, dipropylamine, tripropylamine, isobutylamine, n-butylamine and morpholine,
    (c) adding the mixture of (b) to an aqueous solution of another portion of said vinyl compound copolymer containing said volatile base to prepare an aqueous dispersion,
    (d) coating a support surface with the aqueous dispersion of (c),
    (e) said vinyl compound copolymer being soluble in the materials set forth in (a) and being the copolymer of at least one vinyl monomer selected from the group consisting of vinyl acetate, acrylic ester, methacrylic ester and styrene with a polymerizable monomer containing at least one carboxyl group selected from the group consisting of crotonic acid, acrylic acid, methacrylic acid, itaconic acid, maleic acid, maleic anhydride and mono-alkyl itaconate.

3. A method of claim 2 wherein said vinyl compound copolymer is a vinyl acetate-crotonic acid copolymer having 1-10 mol percent of carboxylic acid.

4. A method of claim 2 wherein said vinyl compound copolymer is a copolymer of ethyl acrylate, methyl methacrylate and acrylic acid.

5. A method of claim 2 wherein said vinyl compound copolymer is a copolymer of styrene and maleic anhydride.

6. A method of claim 2 wherein said vinyl compound copolymer is a copolymer of methyl acrylate, methyl methacrylate and a copolymerizable monomer having at least one carboxyl group.

References Cited

UNITED STATES PATENTS

| 3,586,532 | 6/1971 | Freed | 117—201 |
| 3,585,027 | 6/1971 | Shimizu | 96—1.8 |
| 3,481,735 | 12/1969 | Graver | 96—1.8 |
| 3,547,678 | 12/1970 | Conley | 96—1.8 |
| 3,160,503 | 12/1964 | Cady | 117—201 |

FOREIGN PATENTS

| 805,616 | 2/1969 | Canada | 117—201 |

RALPH S. KENDALL, Primary Examiner

M. F. ESPOSITO, Assistant Examiner

U.S. Cl. X.R.

96—1.8